United States Patent [19]
Tasaki et al.

[11] Patent Number: 5,511,113
[45] Date of Patent: Apr. 23, 1996

[54] SERVICE SWITCHING POINT AND SYSTEM FOR CREATING DETAILED CHARGING INFORMATION

[75] Inventors: Koji Tasaki; Takashi Hidaka; Akira Orita, all of Kawasaki, Japan

[73] Assignee: Fujitsu Limited, Kanagawa, Japan

[21] Appl. No.: 190,556

[22] Filed: Feb. 2, 1994

[51] Int. Cl.$^6$ .......................... H04M 15/00; H04M 3/42; H04M 7/06; H04J 3/12
[52] U.S. Cl. .......................... 379/112; 379/114; 379/115; 379/201; 379/230; 370/110.1
[58] Field of Search ..................................... 379/111, 112, 379/114, 115, 121, 130, 230, 201, 207, 221, 220; 370/110.1

[56] References Cited

U.S. PATENT DOCUMENTS

| | | | |
|---|---|---|---|
| 5,008,929 | 4/1991 | Olsen et al. | 379/115 X |
| 5,247,571 | 9/1993 | Kay et al. | 379/112 X |

OTHER PUBLICATIONS

Euzen et al., "Intelligent Network Products," *Electrical Communication*, 1989 (see all).

Boese et al. "SCP: The Brains Behind IN", *Bellcore Exchange*, Nov./Dec. 1912 1987, (see all).

*Primary Examiner*—Stephen Chin
*Assistant Examiner*—Paul Loomis
*Attorney, Agent, or Firm*—Staas & Halsey

[57] ABSTRACT

A service switching point equipped with a switching function and connected via a communication network to a service control point equipped with an additional-service control function sends a request for an additional service to the service control point when the additional service is requested by a terminal (subscriber). The service control point executes control for the additional service, creates additional service charging information (first charging information) related to the additional service and sends the first information to the service switching point. The latter creates second charging information, which is information related to the ordinary service, as part of detailed charging information and creates detailed charging information by combining the first charging information, which is sent from the service control point, with the second charging information.

9 Claims, 18 Drawing Sheets

FIG. 19 (PRIOR ART)

| | No. | INFORMATION | BYTE LENGTH |
|---|---|---|---|
| 6c-1 | 1 | BYTE LENGTH OF BASIC PART | 1 |
| 6c-2 | 2 | AMA RECORD SERIAL NO. | 3 |
| 6c-3 | 3 | DATA RECORD TYPE | 1 |
| 6c-4 | 4 | CHARGED PARTY IDENTIFIER (CALLING PARTY, CALLED PARTY, THIRD PARTY) | 1 |
| 6c-5 | 5 | DISTINCTION BETWEEN BASIC CALL AND ADDITIONAL-SERVICE CALL, ETC. | 1 |
| 6c-6 | 6 | CHARGING METHOD | 1 |
| 6c-7 | 7 | CALLING PARTY INFORMATION (INCLUDES CALLING PARTY NUMBER) | 16 |
| 6c-8 | 8 | CALLED PARTY INFORMATION (INCLUDES CALLED PARTY NUMBER) | 14 |
| 6c-9 | 9 | CALL ESTABLISHED DATE AND TIME | 6 |
| 6c-10 | 10 | CALL ANSWER TIME | 4 |
| 6c-11 | 11 | CALL RELEASE TIME | 4 |
| 6c-12 | 12 | DURATION OF CALL | 4 |
| 6c-21 | 21 | ADDITIONAL SERVICE IDENTIFICATION INDICATOR | 8 |
| 6c-22 | 22 | CHARGED PARTY NUMBER | 15 |

SERVICE SWITCHING POINT AND SYSTEM FOR CREATING DETAILED CHARGING INFORMATION

BACKGROUND OF THE INVENTION

This invention relates to a service switching point equipped with a function for creating detailed charging information, as well as a system for creating detailed charging information. More particularly, the invention relates to a service switching point for creating detailed charging information composed of charging information for charges associated with additional services and charging information for charges associated with ordinary services, which are services other than the additional services, as well as a system for creating detailed charging information, in which the system has the above-mentioned service switching point and a service control point equipped with an additional-service control function.

An exchange having a function for collecting data for detailed charging (AMA data) is adapted to collect, as detailed charging data associated with a call, basic call data and information relating to an additional service if the additional service is used, wherein the basic call data includes a calling party number, a called party number, outgoing call time and call end time (or call duration), etc. It should be noted that "AMA" is the abbreviation of "automatic message accounting system". The AMA data is edited by software in the exchange whenever a single call ends and is stored in an external unit such as a magnetic tape. In a prior system for creating detailed charging information, the items of the charging information collected as the AMA data and the editing format thereof are incorporated in the software of each exchange. Accordingly, in a case where it is necessary, to, change or add to a collected item of information or to editing format owing, say, to introduction of a new service, the software of all exchanges that perform editing of AMA data must be updated individually.

In a network in which an intelligent network (IN) has been introduced, an architecture is adopted in which the exchange (the service switching point, or SSP) provides a predetermined switching operation and service control is performed by a service control point, or SCP.

FIG. 16 is a block diagram illustrating the configuration of a communication network in which an intelligent network has been introduced. The network includes a service switching point 1 having a switching function, a service control point 2 having an additional-service control function, a No. 7 signaling network 3 that performs an exchange of signals between the points 1 and 2, and a number of telephone terminals 4, 5, . . . . The service switching point 1 is equipped with a number of exchanges 1a, 1b, . . . , each of which has a network switching module NW and a central processing unit CCP. Also included, although not shown, are a subscriber circuit, a relay trunk circuit and an external unit such as a magnetic tape. The service control point 2, which is constituted by a computer, is capable of exchanging data with each exchange and is equipped with a processor CPU, a memory MM for storing a service program, and a data base DB for storing data needed to execute the additional service (IN service). When a call accompanied by a special number is placed from an originating subscriber A in such an intelligent network, the exchange 1a on the originating side gives notice of this special number to the processor CPU of the service control point 2, and the processor CPU executes service analysis of the entered special number in accordance with the service program SVP. If a service such as a free dialing service or transfer service is requested by the special number, the processor obtains the telephone number of a terminating subscriber B from the data base DB, notifies the originating exchange 1a of the results of analysis (the telephone number, etc.) and establishes an ordinary path by means of the service switching point 1.

FIG. 17 is a diagram showing the operating sequence in service control of a free dialing call (billing of the terminating side). ① When a subscriber transmits an access code ***** (where * is a numerical value), ② the SSP, which is the exchange, verifies free dialing and makes an inquiry of the SCP regarding the destination of the connection. ③ The SSP subsequently creates free-dialing charging information. ④ The SCP, on the other hand, goes to the data base DB to obtain the telephone number of the connection designation corresponding to the access code ***** and instructs the SSP of this telephone number. ⑤ As a result, a connection is made with the party and ⑥ a call is established. ⑦ When an on-hook (disconnect) operation is carried out in response to the end of a call, ⑧ the SSP creates AMA data that contains free-dialing charging information.

FIG. 18 is a diagram showing the composition of the record of AMA data having a variable-length structure. Numeral 6a denotes a record descriptor word in which the byte length of the AMA data is entered, 6b the record type in which the fact that the record is the AMA data record is entered, 6c a basic part in which is entered such basic call information as the calling party number, the called party number, outgoing call time and call end time, as well as additional-service information, etc., 6d an extended part in which extended information (information identifier, information field length and information content) is entered, and 6e a stopper (all "0" s) indicating end of the AMA data. The basic part 6c has the items shown in FIG. 19. Specifically, the following items are entered in the basic part 6c: byte length 6c-1 of the basic part, AMA record serial number 6c-2, data record type (distinguishes between ISDN residential call and analog residential call) 6c-3, charged party identifier (distinguishes among calling party, called party and third party) 6c-4, distinction 6c-5 between basic call and additional-service call, charging method 6c-6, calling party information (calling party number, etc.) 6c-7, called party information (called party number) 6c-8, call established date and time 6c-9, call answer time 6c-10, call release time 6c-11, duration of call 6c-12, . . . , additional service identification indicator 6c-21 and charged party number 6c-22.

Accordingly, in control ③ of the free-dialing call service, charging information (items 6c-5, 6c-21, 6c-22) of the additional service is created and the remaining items of the basic part are created at ⑧ to produce the AMA data.

When a new service is introduced in a communication network to which an intelligent network has been introduced, this is dealt with only by interchanging the files (changing the software) of the service control point SCP unless there is a change in the switching operating of the service switching point SSP, and it is unnecessary to interchange the files (the software) of the SSP.

In the prior art, however, all of the charging information inclusive of that for an additional service is created by the software of the SSP. Consequently, when it is necessary to make a change or addition to an item of collected information or to an editing format when a new service is introduced, it becomes necessary to change the SSP software for the creation of detailed charging information even if there is no change in the switching operation. In other words, a problem with the prior art is that the software of the SSP must always be changed when a new service is introduced.

SUMMARY OF THE INVENTION

Accordingly, an object of the present invention is to provide a service switching point and a system for creating detailed charging information, in which it is unnecessary to change the software of the service switching point SSP when a new service is introduced.

Another object of the present invention is to provide a service switching point and a system for creating detailed charging information, in which the service switching point SSP creates second charging information related to the ordinary service and merely incorporates first charging information related to the additional service in the second charging information to create detailed charging information.

Yet another object of the present invention is to provide a service switching point and a system for creating detailed charging information, in which even if there is a change in a collected item of IN-related charging information or in the editing format, it suffices to change only the software of the service switching point SCP.

In accordance with the present invention, the foregoing objects are attained by a service switching point comprising means for receiving, via a communication network, first charging information related to an additional service created by a service control point in a case where an additional service has been requested by a subscriber, means for creating second charging information, which is information related to an ordinary service, as part of detailed charging information, and means for creating detailed charging information by combining the first charging information, which is sent from the service control point, with the second charging information.

Further, according to the present invention, the foregoing objects are attained by a system for creating detailed charging information comprising: a service control point having a data base for storing various data for an additional service and means for executing additional-service control upon referring to the data, which has been stored in the data base, when an additional service has been requested, and for creating first charging information (related to an additional service) and transmitting the first charging information to a service switching point; a service switching point having means for creating second charging information, which is related to an ordinary service, as part of detailed charging information, and means for creating detailed charging information by combining the first charging information, which is sent from the service control point, with the second charging information; and a signaling network performing an exchange of signals between the two points.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 19 is a diagram for describing the contents of the basic part of AMA data according to the prior art.

DESCRIPTION OF THE PREFERRED EMBODIMENTS

(a) Overview of the invention

Figure 1:
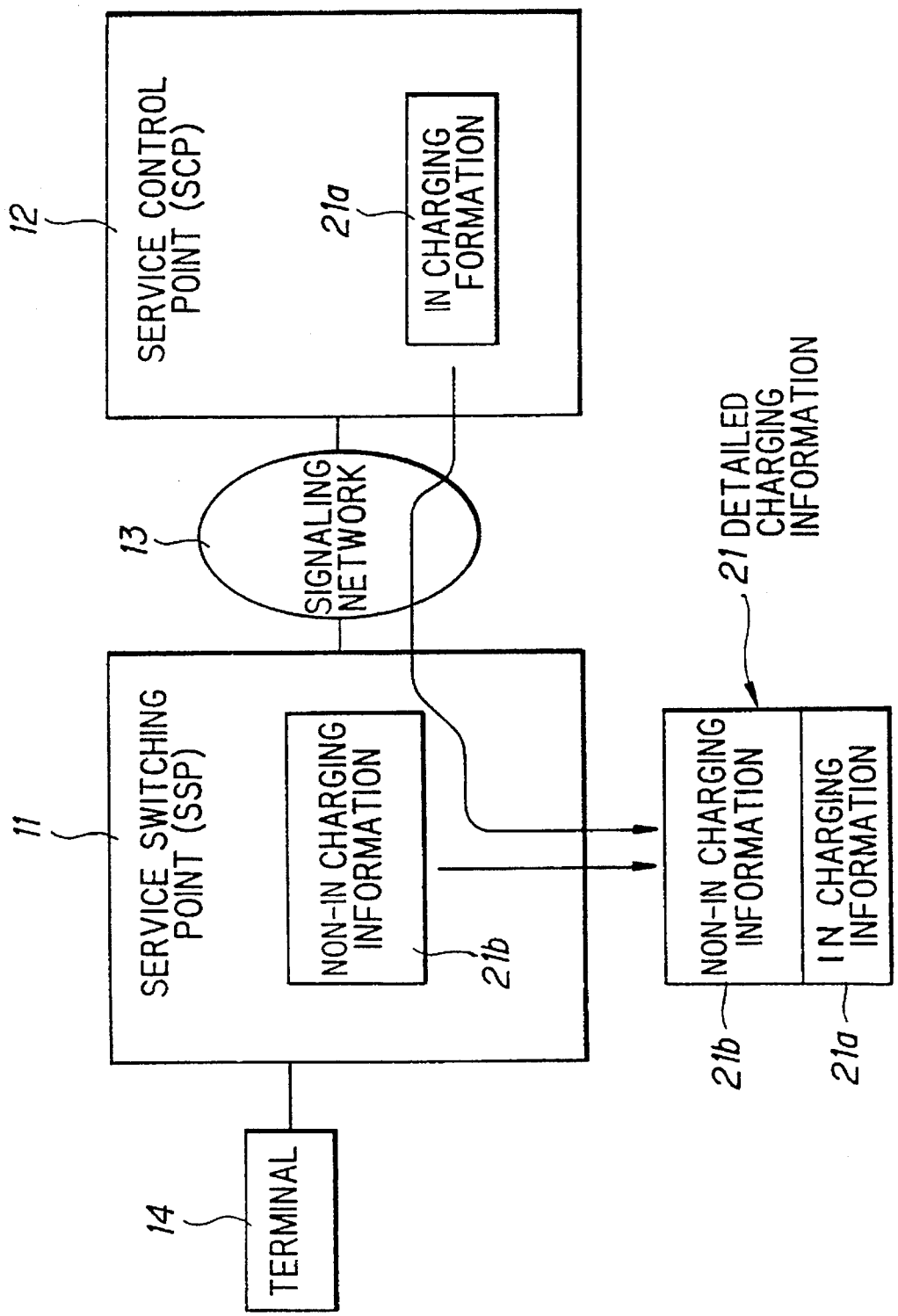
FIG. 1 is a diagram for describing the principles of the present invention.

FIG. 1 is a diagram for describing an overview of the invention.

Shown in FIG. 1 are a service switching point (SSP) 11 having a switching function, a service control point (SCP) 12 having a service control function, a signaling network 13 for performing an exchange of signals between both points, a terminal 14, and detailed charging information 21 containing service charging information (IN-related charging information) 21a and non-IN-related charging information, which is information other than IN-related charging information.

When an additional service is requested by the terminal (subscriber) 14, the service switching point 11 transmits the request to the service control point 12. The latter executes control for the additional service, creates the first charging information (IN-related charging information) 21a related to the additional service and transmits the information 21a to the service switching point 11. The service switching point 11 creates the second charging information (non-IN-related charging information) 21b, which is related to the ordinary service and information other than the IN-related charging information, as part of detailed charging information, and creates detailed charging information by combining the IN-related charging information 21a, which is sent from the service control point 12, with the non-IN-related charging information 21b.

For example, assume that the detailed charging information 21 is of variable length and has (a) a charging information identifier, (b) a charging information field length, (c) a basic part, (d) n-number (where n is an integer greater than 0) of extended parts and (e) a stopper. The service control point 12 creates the IN-related charging information 21a (additional information such as an IN-related charging information identifier, additional-information field length, name of additional service, etc.), the composition of which is the same as that of the extended part, and sends the information 21a to the service switching point 11. The latter stores the IN-related charging information 21a and, upon completion of a call, creates the non-IN-related charging information 21b having (a) the charging information identifier, (b) the charging information field length and (c) the basic part, which includes the calling party number, the called party number, outgoing call time and call end time, etc. Next, the service switching point 11 places the IN-related charging information 21a after the non-IN-related charging information 21b as the extended part, and places the stopper after the IN-related charging information 21a, thereby creating the detailed charging information 21. If this arrangement is adopted, the software of the service switching point SSP need not be changed when a new service is introduced. Moreover, the detailed charging information can be created in a simple manner.

The signaling network 13 is constituted by a No. 7 common channel signaling network or by a signaling network in which the service switching point 11 and the service control point 12 are placed in 1:1 correspondence and an exchange of signals is performed between the two points 11, 12 by a prescribed protocol, such as X.25.

(b) Embodiment (b-1) Overall configuration

Figure 2:
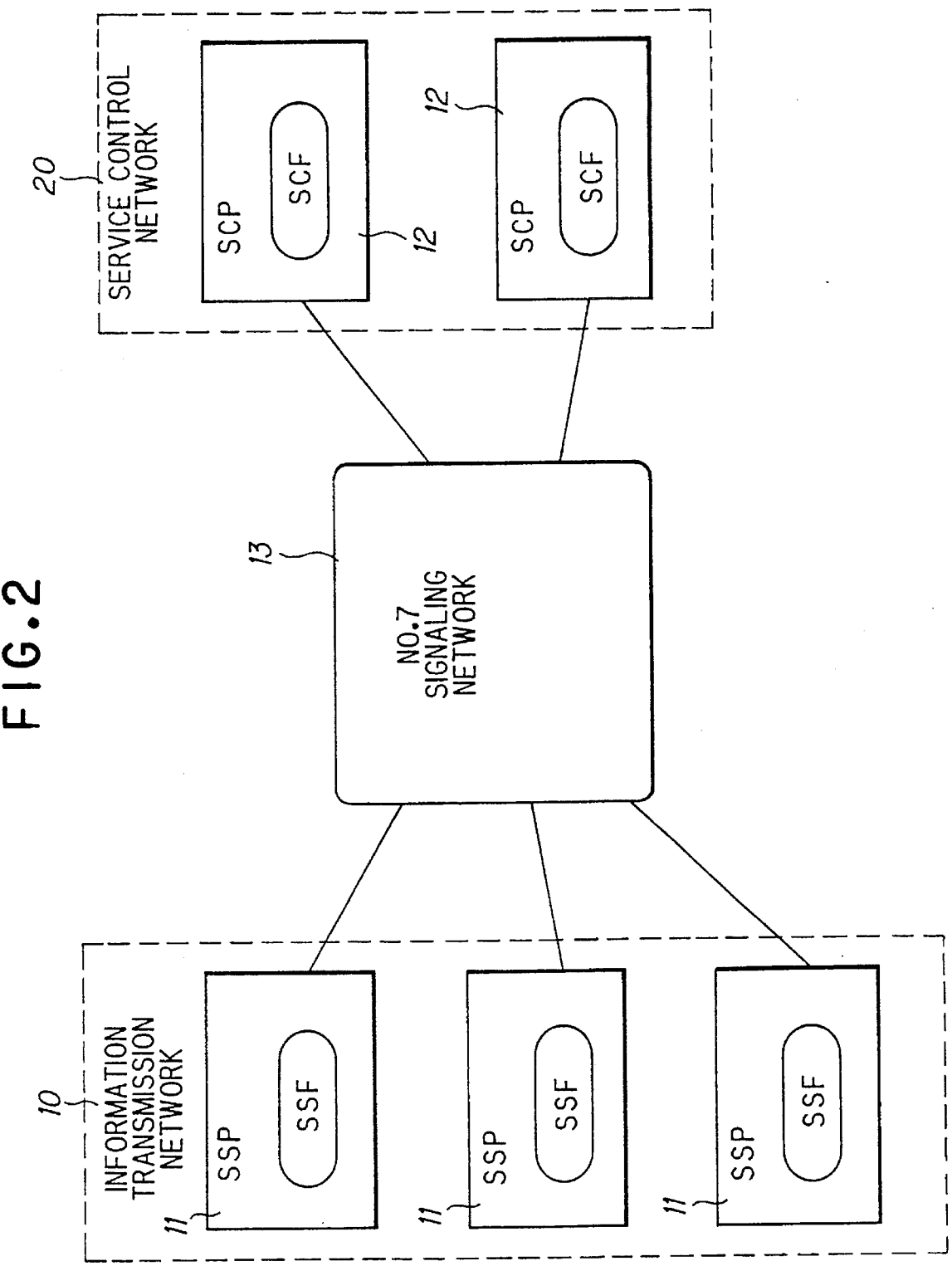
FIG. 2 is a block diagram illustrating the overall configuration of a communication network to which the present invention can be applied.

FIG. 2 is a block diagram illustrating the overall configuration of a system for creating detailed charging information according to the present invention. Numeral 10 denotes an information transmitting network having a number of the service switching points (exchanges) SSP 11 each of which is equipped with a service switching function SSF. Numeral 20 denotes a service control network (intelligent network) having a plurality of the service control points (SCP) 12 each of which is equipped with a service control function SCF. Numeral 13 denotes the No. 7 common channel signaling network for supervising an exchange of control signal between the information transmitting network 10 and the service control network 20.

Figure 3:
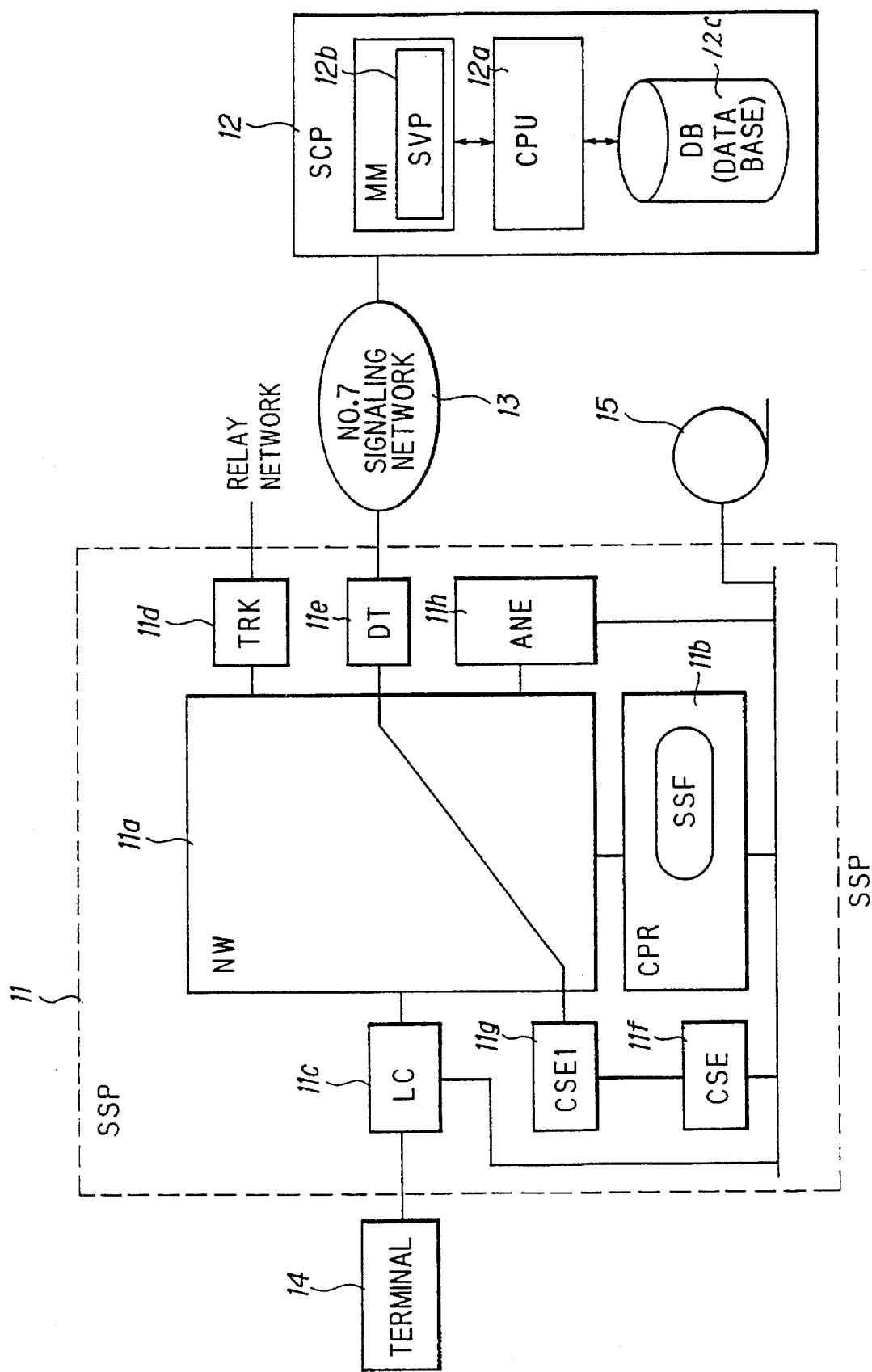
FIG. 3 is a block diagram showing the construction of a service switching point and the construction of a service control point.

FIG. 3 is a block diagram showing the construction of the service switching point SSP and the construction of the service control point SCP. Numeral 11 denotes the service switching point SSP, 12 the service control point SCP, 13 the No. 7 common channel signaling network, 14 the terminal and 15 an external storage device such as a magnetic tape that stores detailed charging information. The service switching point (SSP) 11 includes a network switching module (NW) 11a, a call processing processor (CPR) 11b for implementing the switching function SSF such as call processing or charging processing, a subscriber circuit (LC) 11c, a trunk (TRK) 11d, a digital terminal (DT) 11e serving as a PCM link interface, common channel signaling equipment (CSE) 11f, a common channel signaling equipment interfacer (CSEI) 11g, and announcement equipment (ANE) 11h for outputting various voice messages.

The service control point (SCP) 12 includes a processor (CPU) 12a for executing service control processing, creating charging information (IN-related charging information) related to an additional service (IN service) and transferring the created information to the service switching point 11, a memory (MM) 12b for storing a service program SVP, and a data base (DB) 12c for storing data that becomes necessary when an additional service is implemented.

(b-2) Construction of call processing processor

Figure 4:
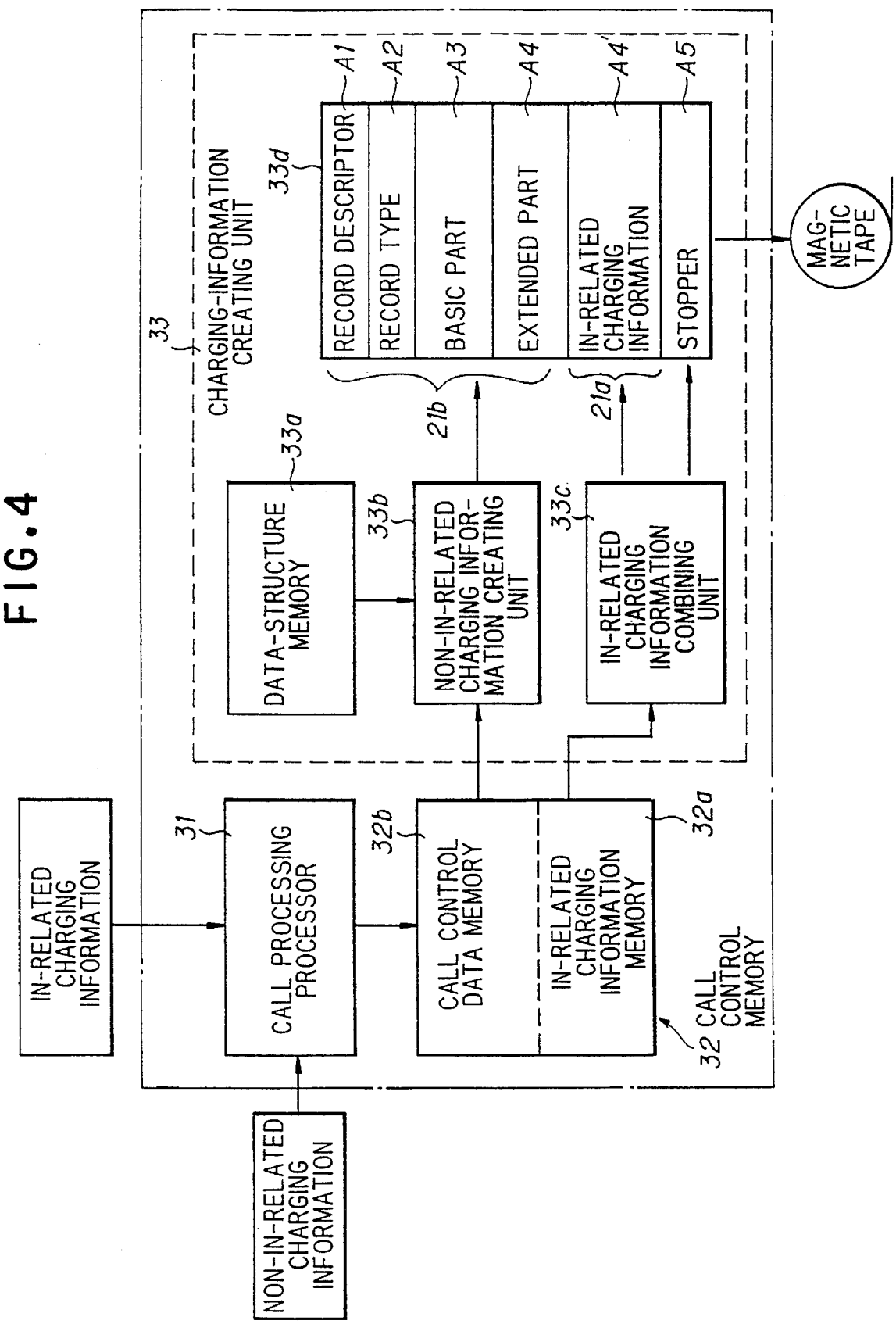
FIG. 4 is a diagram showing the functional construction of a call processing processor.

FIG. 4 is a diagram showing the functional construction of the call processing processor CPR, which has a call processing unit 31, a call control memory unit 32 and a charging-information creating unit 33. The call processing unit 31, which is connected to the network switching module 11a (FIG. 3), the subscriber circuit 11c, the trunk 11d, the common channel signaling equipment 11f and the announcement equipment 11h, executes call processing control, collects data necessary for creating detailed charging information and stores the data in the call-control memory unit 32. The charging-information creating unit 33 creates the non-IN-related charging information 21b, which is information other than IN-related charging information, and combines the IN-related charging information 21a, which has been sent from the service control point SCP 12, with this non-IN-related charging information, thereby created detailed charging information.

The detailed charging information 21a, which is created by the service control point 12, enters the call processing unit 31 via the No. 7 common channel signaling network 13 →data terminal 11e→network switch module 11a→common channel signaling equipment interfacer 11g→common channel signal equipment 11f, and is stored in a memory 32a, which is for storing IN-related charging information. The non-IN-related charging information 21b, which includes a calling party number, a called party number, call answer time and call release time, is obtained by the call processing unit 31 in a call processing operation and is stored in a memory 32b, which is for storing call control data.

Figure 5:
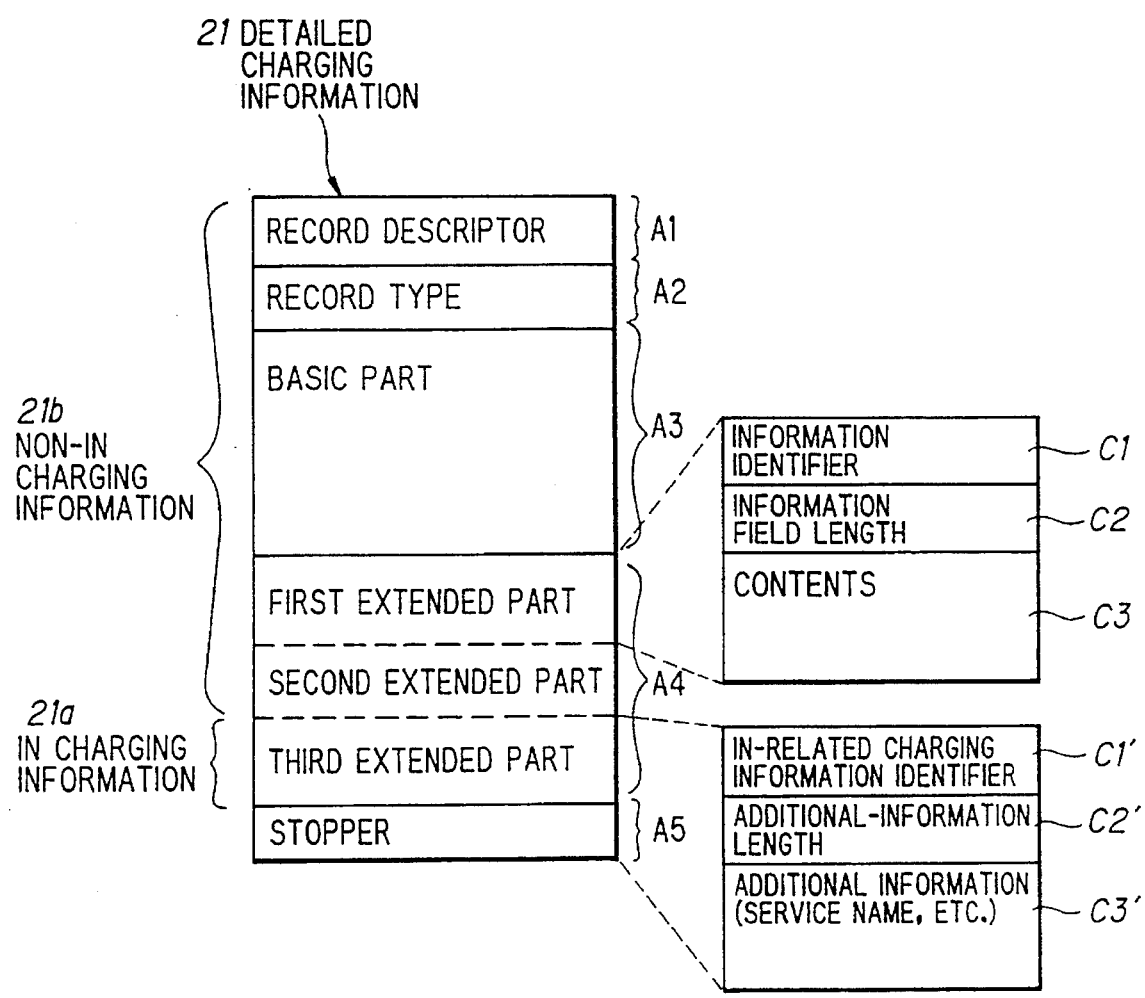
FIG. 5 is a diagram showing the composition of detailed charging information.

According to the data structure of the detailed charging information 21, as shown in FIG. 5, the data includes (a) a record descriptor A1 in which the byte length of the data is entered, (b) record type A2 in which the fact that the record is the AMA data record is entered, (c) a basic part A3, (d) n-number (where n is an integer greater than 0) of extended parts A4 and (e) a stopper A5 indicating the end of the charging information. The data has a variable-length arrangement, in which a plurality of extended parts can be placed as necessary. The basic part A3 does not contain information related to an additional service, unlike the conventional AMA data (see FIG. 19). For example, the basic part does not contain the distinction data 6c-5 indicating the distinction between a basic call and an additional-service call, the additional service identification indicator 6c-21 and the data 6c-22 indicating the charged party number. Each extended part A4 is composed of ① a section C1 for entering an information identifier, ② a section C2 for entering information length and ③ a section C3 for entering information content.

The IN-related charging information 21a is combined with the non-IN-related charging information 21b as an extended part (the third extended part in FIG. 5). This extended part has a structure identical with those of the other extended parts. That is, the IN-related charging information 21a is composed of ① an IN-related charging-information identifier C1', ② additional-information length C2' and ③ additional information C3', which includes the name of the additional service.

Figure 6:
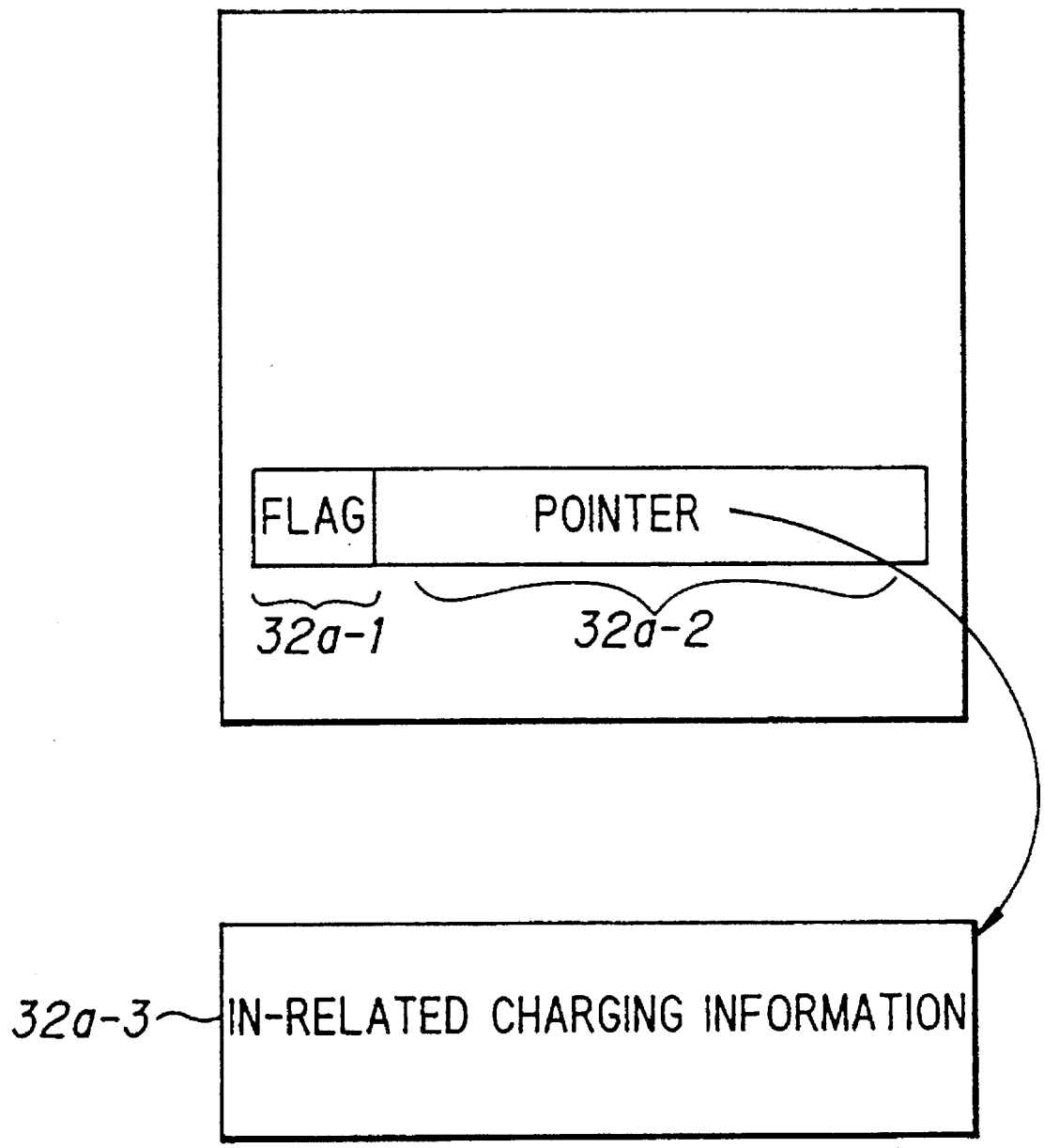
FIG. 6 is a diagram for describing the storing of data in a memory that stores IN-related charging information.

FIG. 6 is a diagram for describing the storing of data in the memory 32a that stores the IN-related charging information in the call control memory 32. The memory 32a includes (a) a flag portion 32a-1 for storing a flag indicating whether or not the IN-related charging information has been received from the service control point 12 and stored, (b) a pointer portion 32a-2 for storing a pointer indicating the location at which the IN-related charging information has been stored, and (c) an information storage portion 32a-3 for storing the IN-related charging information.

The charging-information creating unit 33 (FIG. 4) includes a data-structure memory 33a for storing the data structure (FIG. 5) of the detailed charging information; a non-IN-related charging information creating unit 33b which, upon referring to the non-IN-related charging information that has been stored in the call-control data memory 32b as well as the above-mentioned data structure, creates the non-IN-related charging information 21b by inserting prescribed data in the record descriptor A1, record type A2, basic part A3 and extended part A4; an IN-related charging information combining unit 33c for combining the IN-related charging information, which has been stored in the IN-related charging information memory 32a, with the extended part A4 in the form of an extended party A4', and for placing the stopper A5 after the extended part A4'; and a memory 33d for storing the detailed charging information.

(b-3) Credit-call service

Figure 7:
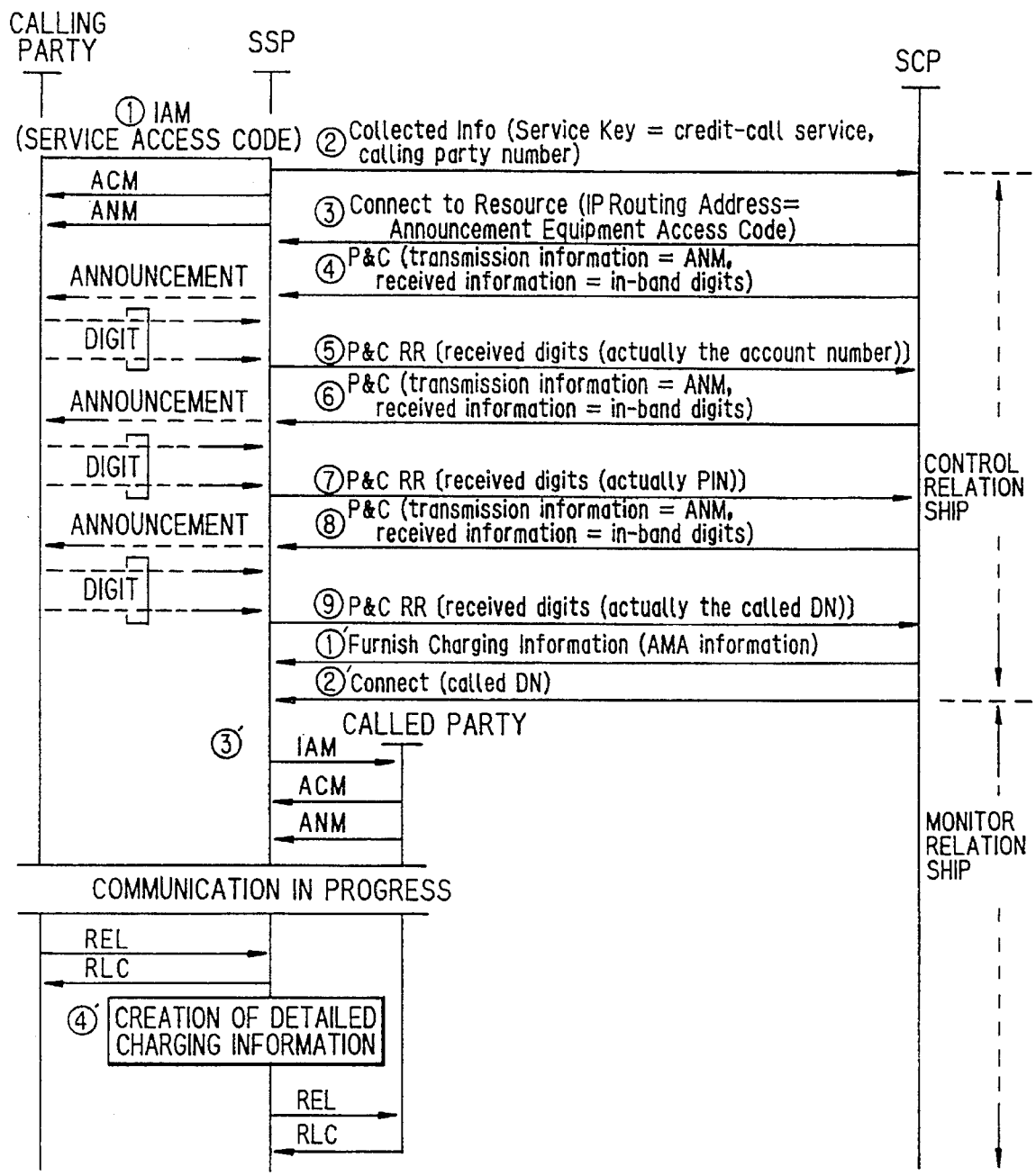
FIG. 7 is a diagram for describing a sequential operation when a credit-call service is provided.

FIG. 7 is a diagram for describing the sequential operation of the invention, specifically for describing the operation performed when a credit-call service is provided. According to the credit-call service, the calling terminal is not billed; rather, the service is charged to a credit-card number designated at the time of an outgoing call.

① When the calling party enters the service access code of a credit call from the terminal 14 (FIG. 3), ② the service switching point SSP 11 receives the code, recognizes that the call is an IN call (intelligent network call) and sends the following message to the service control point SCP 12 via the No. 7 signaling network 13:

Collected Info (Service Key=credit-call service, calling party number)

As a result, the service control point 12 is notified of the telephone number of the terminal 14 and of the fact that use of the service has been requested.

③ Upon being so notified, the service control point SCP 12 sends the service switching point 11 the following message, which connects the terminal 14 and the announcement equipment 11h (FIG. 3):

Connect to Resource (IP Routing Address= Announcement Equipment Access Code) This is for the purpose of sending the calling party a voice message from the announcement equipment.

④ Next, the service control point SCP sends the service switching point 11 the following message so as to receive the credit card number and notify itself of the card number:

P&C (transmission information=ANM, received information=in-band digits) (where P & C is the abbreviation of "prompt and collect information")

As a result, the service switching point 11 controls the announcing equipment 11h to inform the calling party, by voice, of a message prompting entry of the credit card number.

⑤ When the in-band digits are received from the calling party, the service switching point 11 sends the service control point 12 the following message:

P&C RR [received digits (actually the account number)] (where RR denotes "return request")

⑥ Next, the service control point 12 sends the service switching point 11 the following message so as to receive a secret number and notify itself of the secret number:

P&C (transmission information=ANM, received information=in-band digits)

As a result, the service switching point 11 controls the announcing equipment 11h to inform the calling party, by voice, of a message prompting entry of the secret number.

⑦ When the digits are received from the calling party, the service switching point 11 sends the service control point 12 the following message:

P&C RR [received digits (actually the secret code number PIN)]

⑧ Next, the service control point 12 sends the service switching point 11 the following message so as to receive a called party number and notify itself of the called party number:

P&C (transmission information=ANM, received information=in-band digits)

As a result, the service switching point 11 controls the announcing equipment 11h to inform the calling party, by voice, of a message prompting entry of the called party number.

⑨ When the digits are received from the calling party, the service switching point 11 informs the service control point 12 of the following message:

P&C RR [received digits (actually the called party number)]

①' Thereafter, by way of the following message, the service control point (SCP) 12 instructs the service switching point 11 to create the detailed charging information that includes the IN-related charging information:

Furnish Charging Information (AMA information) At this time the service control point SCP creates the IN-related charging information 21a, adds the IN-related charging information 21a to the above-mentioned message and sends the result to the service switching point (SSP) 11. The latter stores the IN-related charging information 21a in the call control memory 32 (see FIG. 4).

Figure 8:
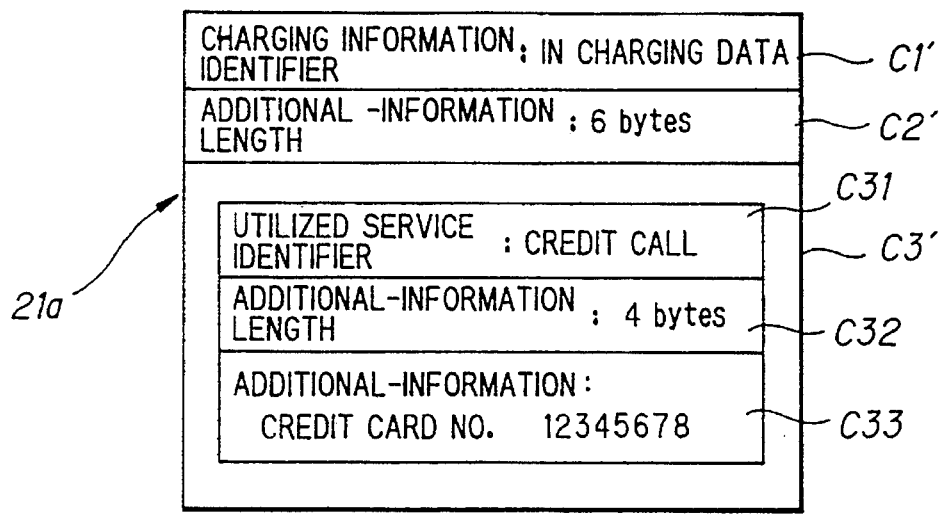
FIG. 8 is a diagram for describing IN-related charging information for a credit-call service.

FIG. 8 is a diagram for describing the IN-related charging information 21a for the credit-call service. Here C1' represents the IN-related charging-information identifier, C2' the additional-information length and C3' the content of the additional information. A utilized-service identifier (credit call) C31, additional-information length C32 and additional information C33 (credit card number) are entered in the section C3', which is the content of the additional information.

Figure 9:
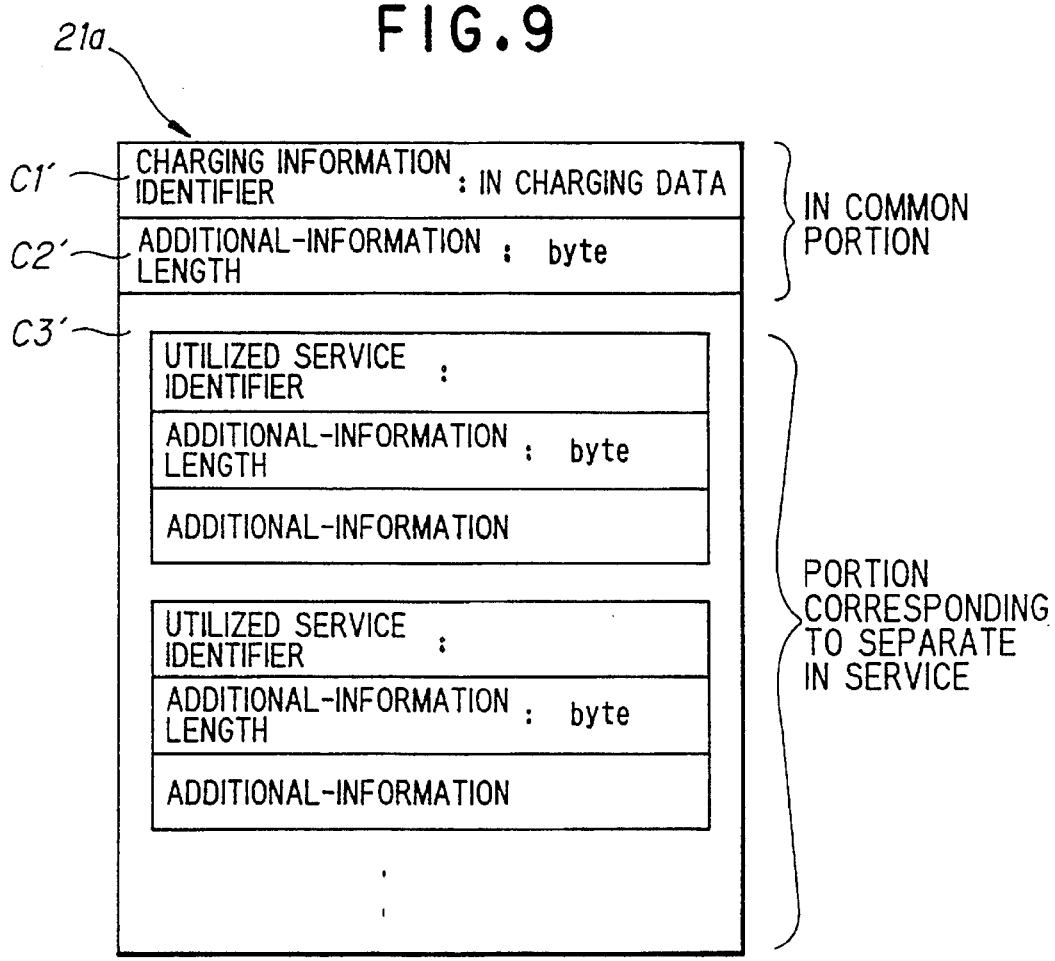
FIG. 9 is a diagram showing the composition of IN-related charging information.

It should be noted that the IN-related charging information 21a has the common portions C1', C2', and the portion C3' whose content is produced separately to correspond to the service, as shown in FIG. 9. That is, the IN-related charging information is constructed as one item of variable-length data overall.

②' Next, the service control point 12 sends the following message to the service switching point 11 to instruct the service switching point to connect the calling party to the called party number:

Connect (called party number)

③' As a result, the service switching point SSP calls the terminating terminal designated by the called party number. If there is a reply (off-hook), the originating terminal and the terminating terminal are connected to establish the communicating state. When the call ends and the on-hook state is attained, the terminal sends a RELEASE message to the service switching point 11, the latter performs disconnect processing and sends a RELEASE COMPLETE message to the terminal.

④' Thereafter, the service switching point 11 creates the detailed charging information 21, as described in connection with FIG. 4, and sends the RELEASE message to the terminating terminal. The terminating terminal performs disconnect processing, sends a RELEASE COMPLETE message to the service switching point and ends control of the credit-call service.

(b-4) Processing flow of service switching point SSP

Figure 10:
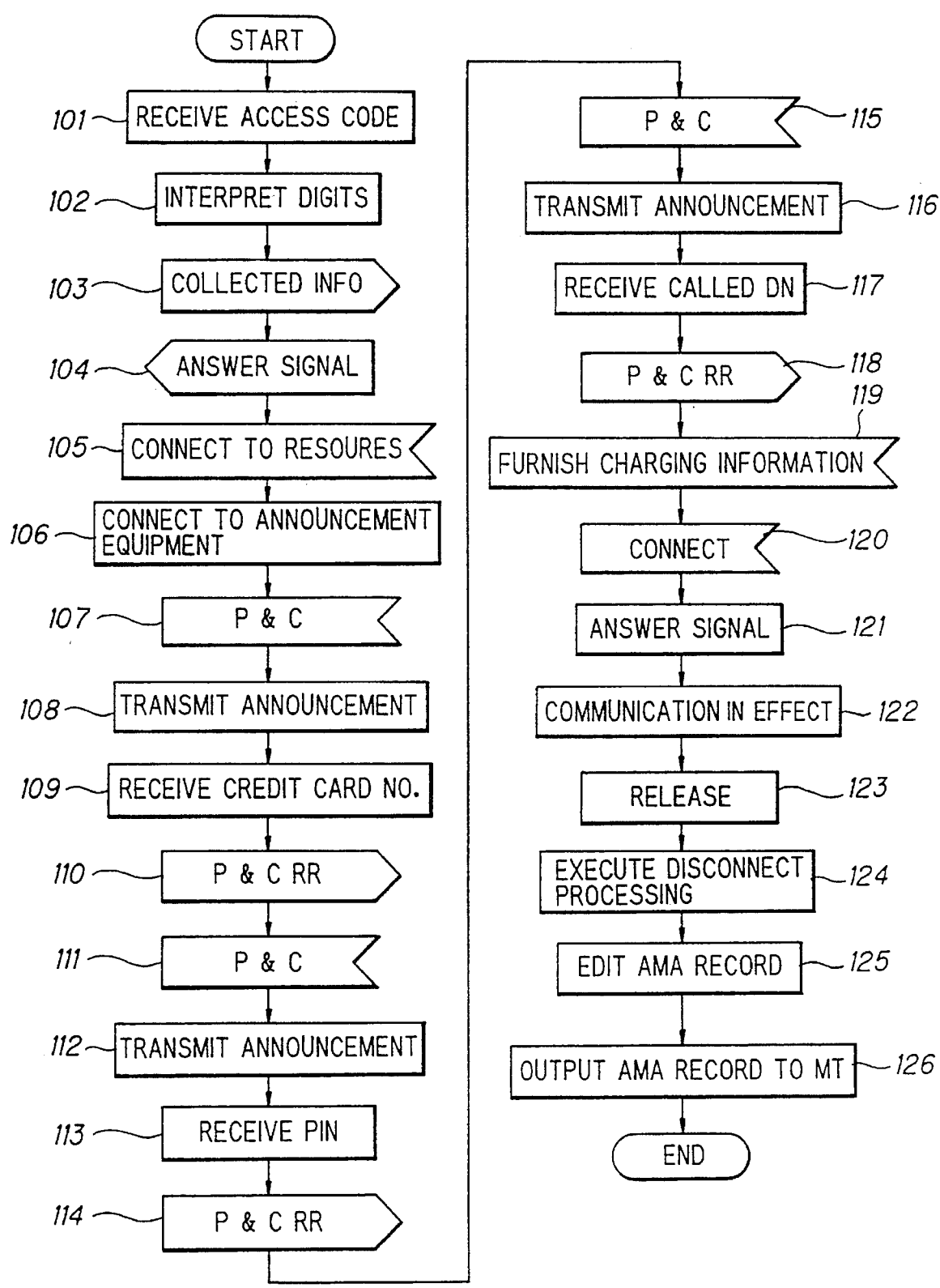
FIG. 10 is a flowchart of processing executed by an SSP in a credit-call service.

FIG. 10 is a flowchart of processing executed by the service switching point SSP in the credit-call service. When the calling party enters a service access code for the credit call from the terminal 14, the service switching point (SSP) 11 receives the access code (step 101) and interprets the digits. If the call is the IN call (intelligent network call), the service switching point 11 sends the following message to the service control point (SCP) 12 via the No. 7 signaling network 13 (step 103):

Collected Info (Service Key=credit-call service, calling party number)

As a result, the service control point (SCP) 12 is notified of the telephone number of the terminal 14 and of the fact that use of the service has been requested. Further, the service switching point 11 sends the answer signals (ACM, ANM) to the terminal (step 104).

When the message

Connect to Resource (IP Routing Address=Announcement Equipment Access Code)

is received from the service control point (SCP) 12 (step 105), the service switching point 11 connects the terminal with the announcement equipment 11h (step 106).

Next, upon receiving, from the service control point SCP, the message

P&C (transmission information=ANM, received information=in-band digits)

requesting the credit card number (step S107), the service switching point 11 causes the announcement equipment to send the calling party the voice message prompting entry of the credit card number (step 108).

When the credit card number is received from the calling party (step 109), the service switching point 11 sends the service control point 12 the following RETURN RESULT message (step 110):

P&C RR (received digits)

Next, upon receiving, from the service control point SCP, the message

P&C (transmission information=ANM, received information=in-band digits)

requesting the secret number (step S111), the service switching point 11 causes the announcement equipment to send the calling party the voice message prompting entry of the secret number (step 112).

When the secret number (PIN) is received from the calling party (step 113), the service switching point 11 notifies the service control point 12 of the following message (step 114):

P&C RR (received digits)

Next, upon receiving, from the service control point (SCP) 12, the message

P&C (transmission information=ANM, received information=in-band digits)

requesting the called party number (step S115), the service switching point 11 causes the announcement equipment to send the calling party the voice message prompting entry of the called party number (step 116).

When the called party number is received from the calling party (step 117), the service switching point 11 notifies the service control point 12 of the following message (step 118):

P&C RR (received digits)

Thereafter, upon receiving, from the service control point (SCP) 12, the message Furnish Charging Information (AMA information) designating creation of the detailed charging information, the service switching point (SSP) 11 sets a flag to "1" and stores the IN-related charging information, which has arrived after being added on to the above-mentioned message, in the call control memory 32 (step 119).

Next, when the message

Connect (called party number)

is received from the service control point 12 (step 20), the service switching point SSP calls the terminating terminal designated by the called party number. If answer signal is received (step 121), then the service switching point connects the originating terminal and the terminating terminal to establish the communicating state (step 122). When the call ends and there is notification of release, disconnect processing is executed (steps 123, 124), after which the service switching point creates the detailed charging information 21 (step 125) and stores the detailed charging information on magnetic tape (step 126).

Figure 11:
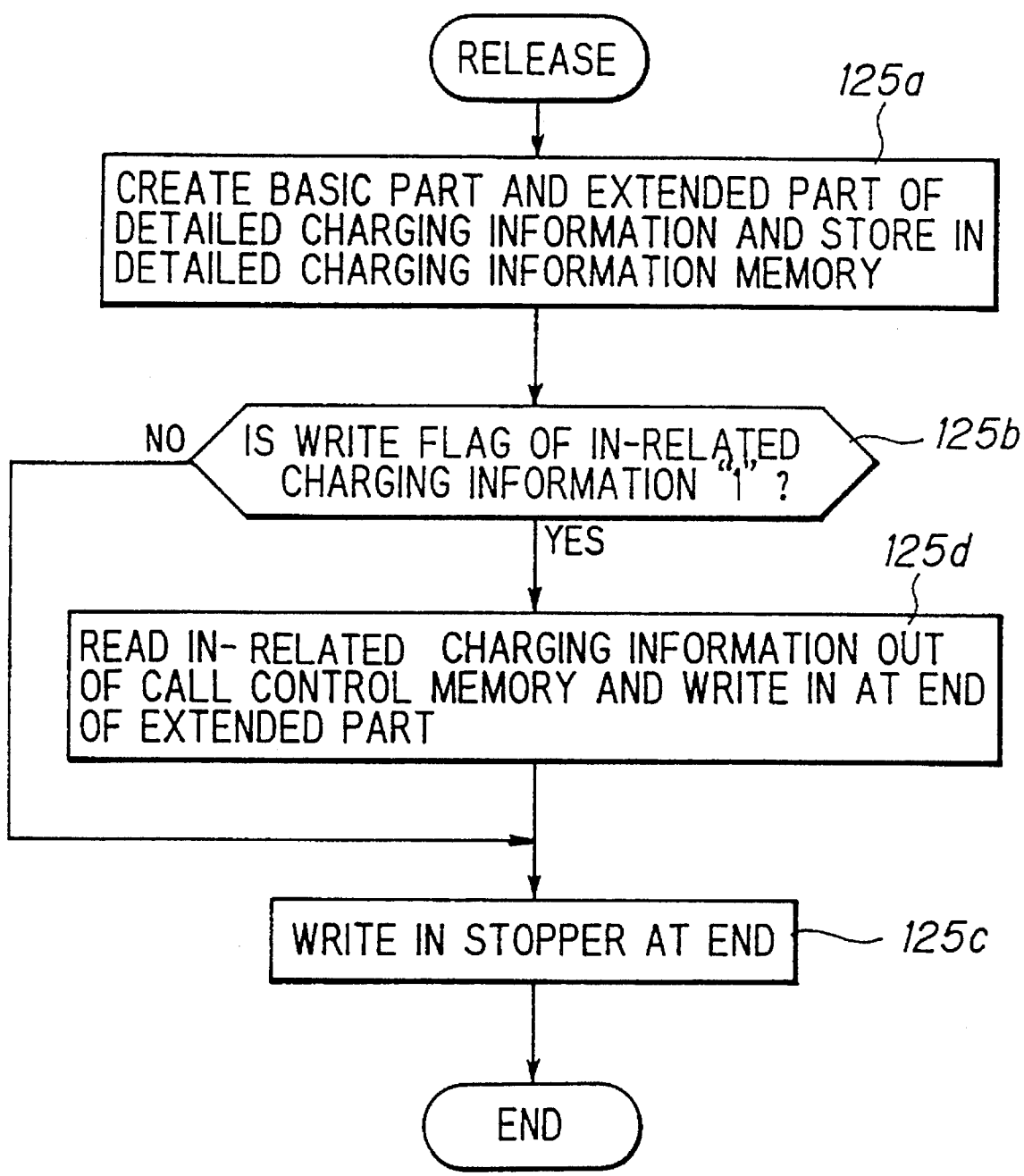
FIG. 11 is a flowchart of processing for editing detailed charging information.

(b-5) Flow of processing for editing detailed charging information executed by service switching point FIG. 11 is a flowchart illustrating the processing, executed by the service switching point, for editing the detailed charging information.

When there is notification of release, the non-IN-related charging information creating unit 33b of the unit 33 (see FIG. 4) that creates the detailed charging information creates the record descriptor A1, record type A2, basic part A3 and extended part A4 of the detailed charging information and stores these in the memory 33d for storing the detailed charging information (step 125a). Next, the IN-related charging information combining unit 33c of the unit 33 that creates the detailed charging information determines whether a flag is "1" or not (step 125b) If the flag is not "1" i.e., if the IN-related charging information has not been received, the stopper A5 is written after the extended part A4 (step 125c) and processing for creating the detailed charging information is concluded.

If the flag is found to be "1 " at step 125b, on the other hand, i.e., if the IN-related charging information has been received and stored in the call control memory 32, then the IN-related charging information combining unit 33c reads out the IN-related charging information and places it after the extended part A4, which has already been created, as a new extended part A4' (step 125d). Next, the stopper A5 is written after the extended part (IN-related charging information) A4 (step 125c) and the processing for creating the detailed charging information is concluded.

(b-6) Processing flow of service control point SCP

Figure 12:
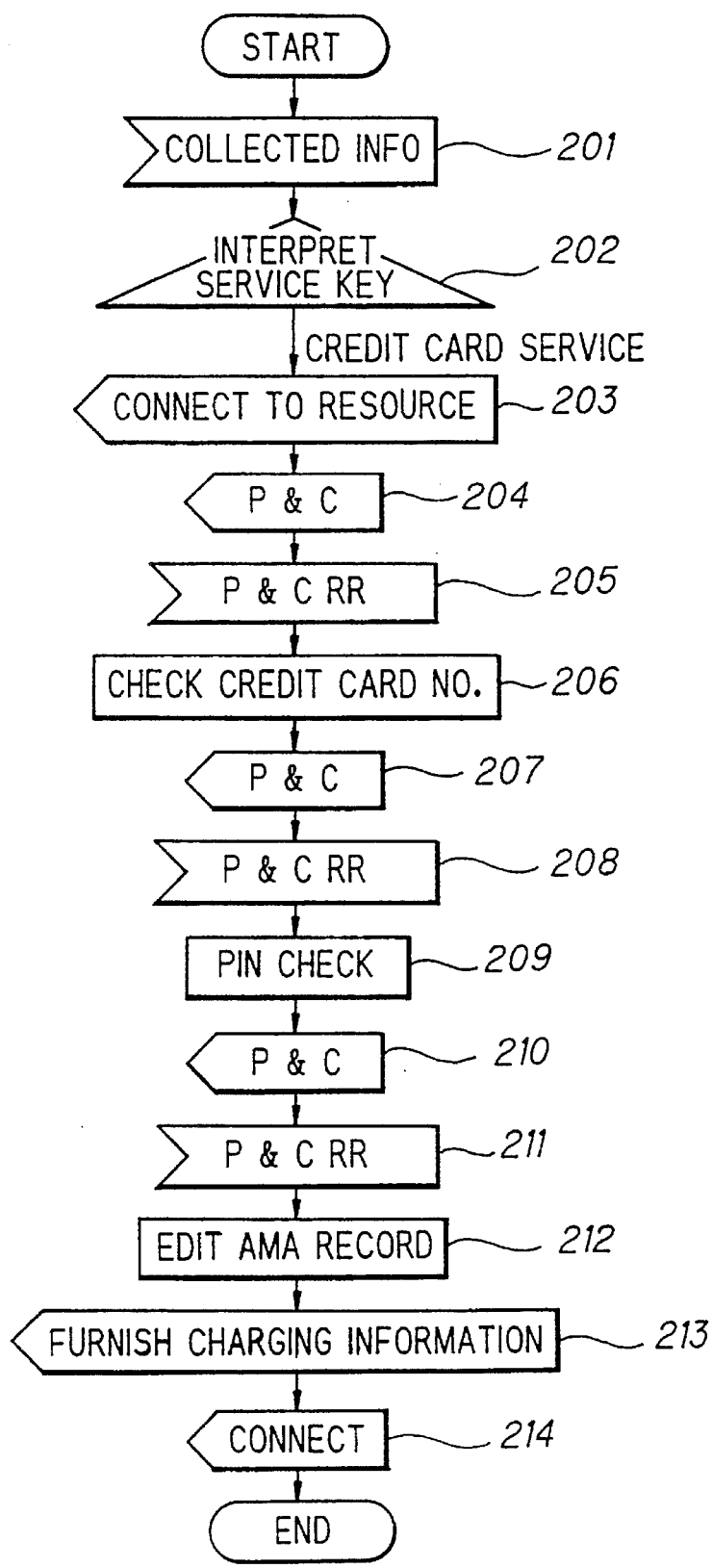
FIG. 12 is a flowchart of processing executed by an SCP in a credit-call service.

FIG. 12 is a flowchart of processing executed by the service control point (SCP) 12 in the credit-call service.

When the "Collect Info" message is received from the service switching point (SSP) 11 (step 201), the service control point (SCP) 12 interprets the service key contained in the "Collect Info" message and recognizes that the service is the credit-call service (step 202). As a result, the service control point sends the "Connect to Resource" message for connecting the originating terminal with the announcement equipment (step 203). Next, the service control point (SCP) 12 sends the service switching point 11 the message "P&C (transmission information=ANM, received information=in-band digits)" so as to receive and give notification of the credit card number (step 204). At this time the message ID regarding the announcement equipment is added on and the announcement equipment informs the calling party, by voice, of a message prompting entry of the credit card number.

Next, when the credit card number is received from the service switching point (SSP) 11 by the message "P&C RR (received digits)" (step 205), the service control point refers to the data base DB to verify whether the credit card number is a subscriber to this service. Further, the service control point verifies whether it is possible for this service to be utilized without the charged fee exceeding the limit on the credit card of the credit card number (step 206).

If the credit-call service is possible, then the service control point 12 sends the service switching point 11 the message "P&C (transmission information=ANM, received information=in-band digits)" so as to receive and give notification of the secret number (step 207). At this time the message ID regarding the announcement equipment is added on and the announcement equipment informs the calling party, by voice, of a message prompting entry of the credit secret number.

Next, when the secret number is received owing to the message "P&C RR (received digits)" from the service switching point (SSP) 11 (step 208), the service control point refers to the data base DB to check whether the secret number corresponds to the credit card number 5 (step 209).

If the secret number corresponds to the credit card number, the service control point 12 sends the service switching point 11 the message "P&C (transmission information= ANM, received information=in-band digits)" so as to receive and give notification of the called party number (step 210). At this time the message ID regarding the announcement equipment is added on and the announcement equipment informs the calling party, by voice, of a message prompting entry of the called party number.

Next, when the called party number is received from the service switching point (SSP) 11 owing to the message "P&C RR (received digits)" (step 211), the service control point 12 creates the IN-related charging information 21a (step 212). Thereafter, the service control point sends the message "Furnishing Charging Information (AMA Information) to the service switching point SSP 11. At this time the service control point (SCP) 12 adds the IN-related charging information on to the above-mentioned message (step 213).

Finally, the service control point 12 sends the message "Connect (Called Party Number)" to the service switching point 11 so as to connect the calling party to the called party number.

(c) Alternative construction of service switchingpoint

Figure 13:
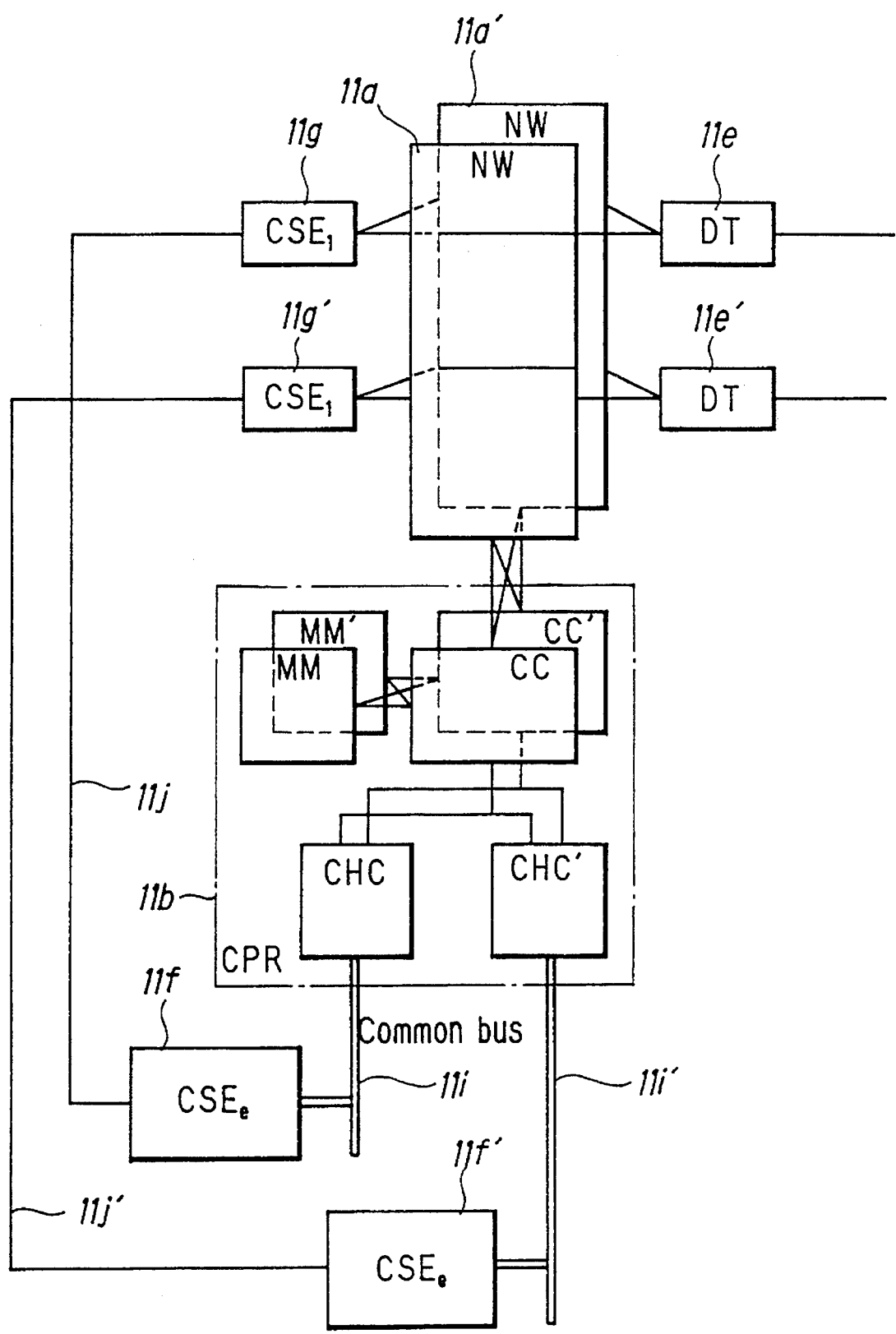
FIG. 13 is a diagram showing an arrangement for providing a service switching point with redundancy.

FIG. 13 is a diagram showing an arrangement for providing the service switching point SSP in FIG. 3 with redundancy. Reliability can be enhanced by duplicating each unit. It should be noted that the subscriber circuit, trunk circuit and announcement equipment are not shown. Numerals 11a, 11a' denote the network switching modules (NW), 11b the call processing processor (CPR) for implementing the switching function (SSF) such as call processing or charging processing, 11e, 11e' the digital terminals (DT) serving as PCM link interfaces, 11f, 11f' the common channel signaling equipment (CSE), 11g, 11g' the common channel signaling equipment interfacers (CSEI), 11i, 11i' command busses, and 11j, 11j' signaling data links. The call processing processor 11b has a redundant construction and includes central processing units CC, CC', main memories MM, MM' and channel controllers CHC, CHC'.

(d) Alternative embodiment not using common channel signaling network

Figure 14:
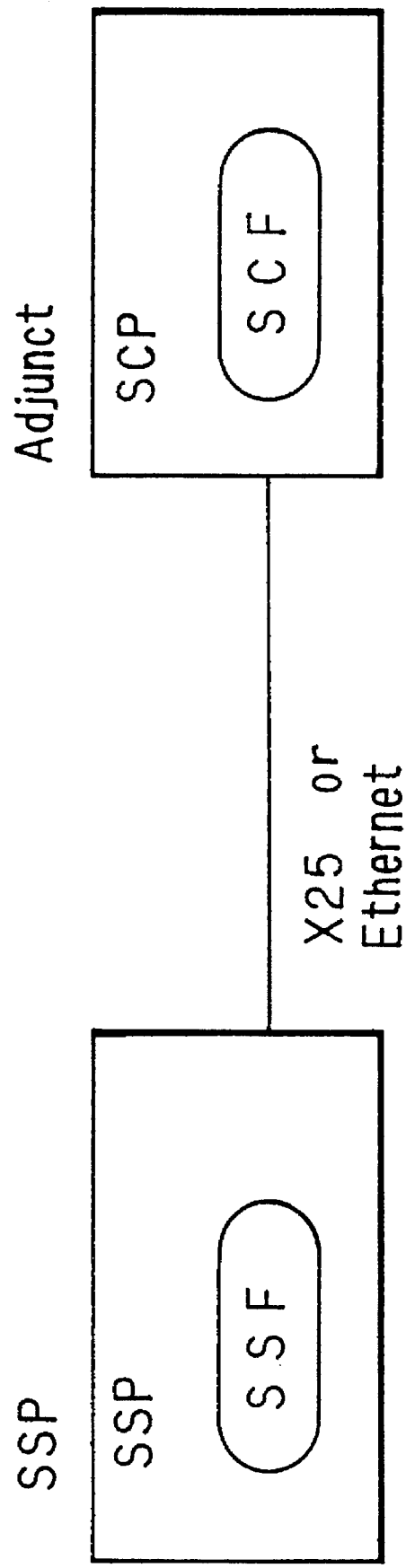
FIG. 14 is a diagram illustrating the arrangement of an intelligent network in the case of an adjunct configuration.

FIG. 14 is a diagram illustrating the arrangement of an alternative embodiment that does not use a common channel signaling network. This diagram depicts the construction of an IN (intelligent network) in the case of an adjunct configuration. In the adjunct configuration, the arrangement is such that the service switching point SSP and the service control point SCP are in 1:1 correspondence and the service control point SCP is one sub-system of the service switching point SSP. Since a LAN or the like is used in the adjunct configuration, an X.25 network or Ethernet, etc., is used as the communication protocol between the service switching point SSP and the service control point SCP (referred to as an "adjunct", or "AD").

Figure 15:
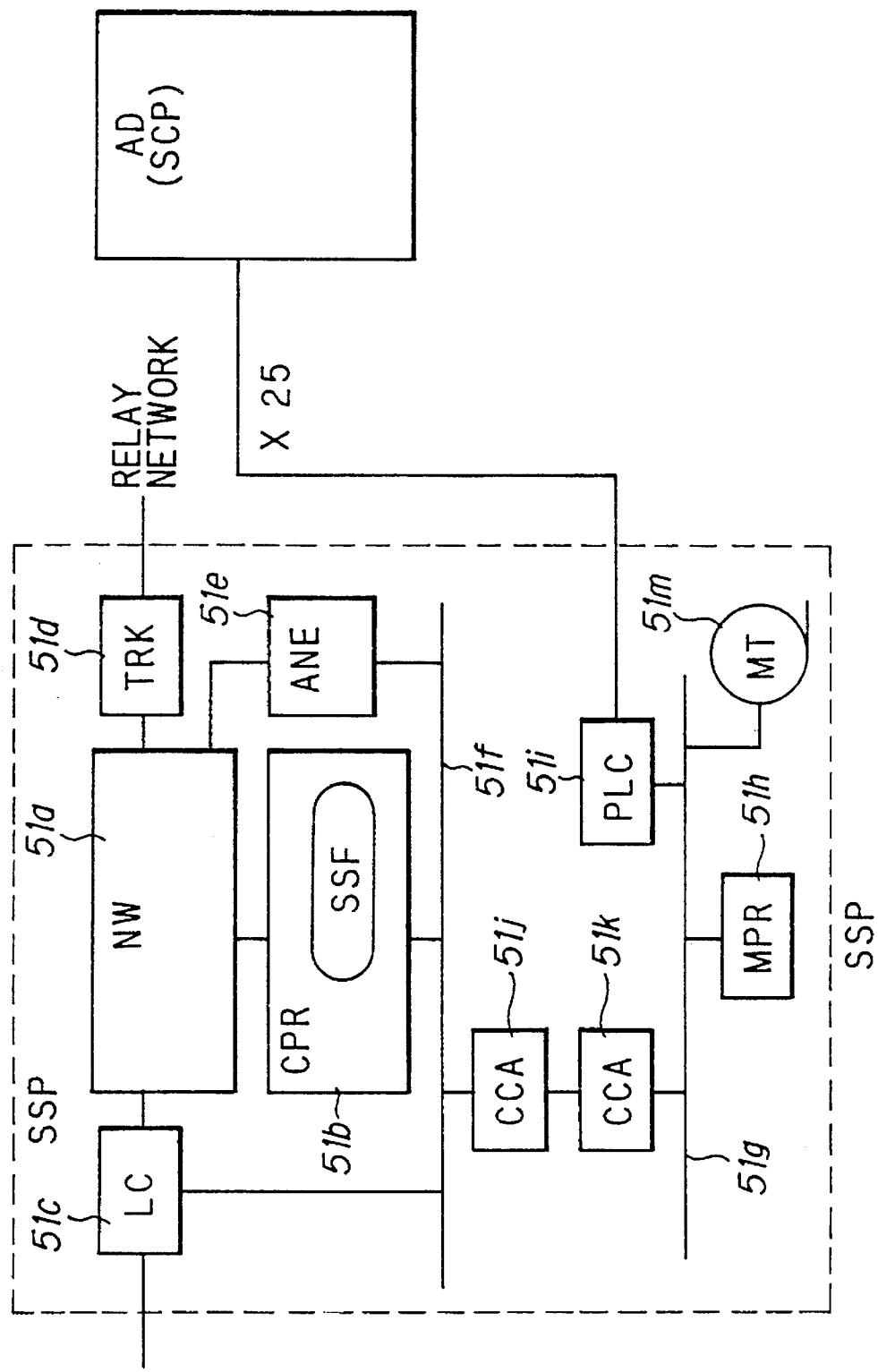
FIG. 15 is a block diagram showing the construction of a service switching point in the adjunct configuration.
Figure 16:
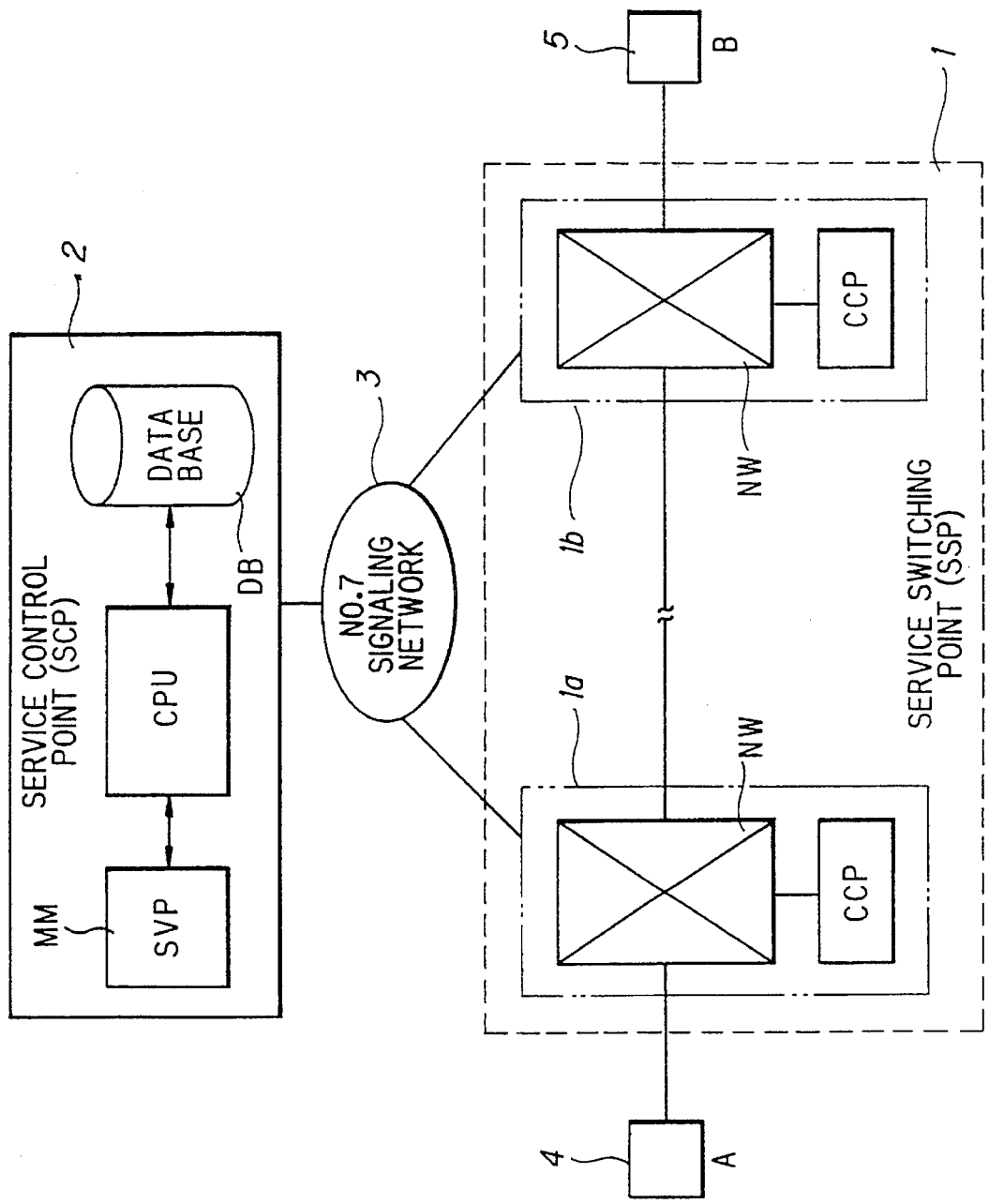
FIG. 16 is a diagram showing the construction of an intelligent network according to the prior art.
Figure 17:
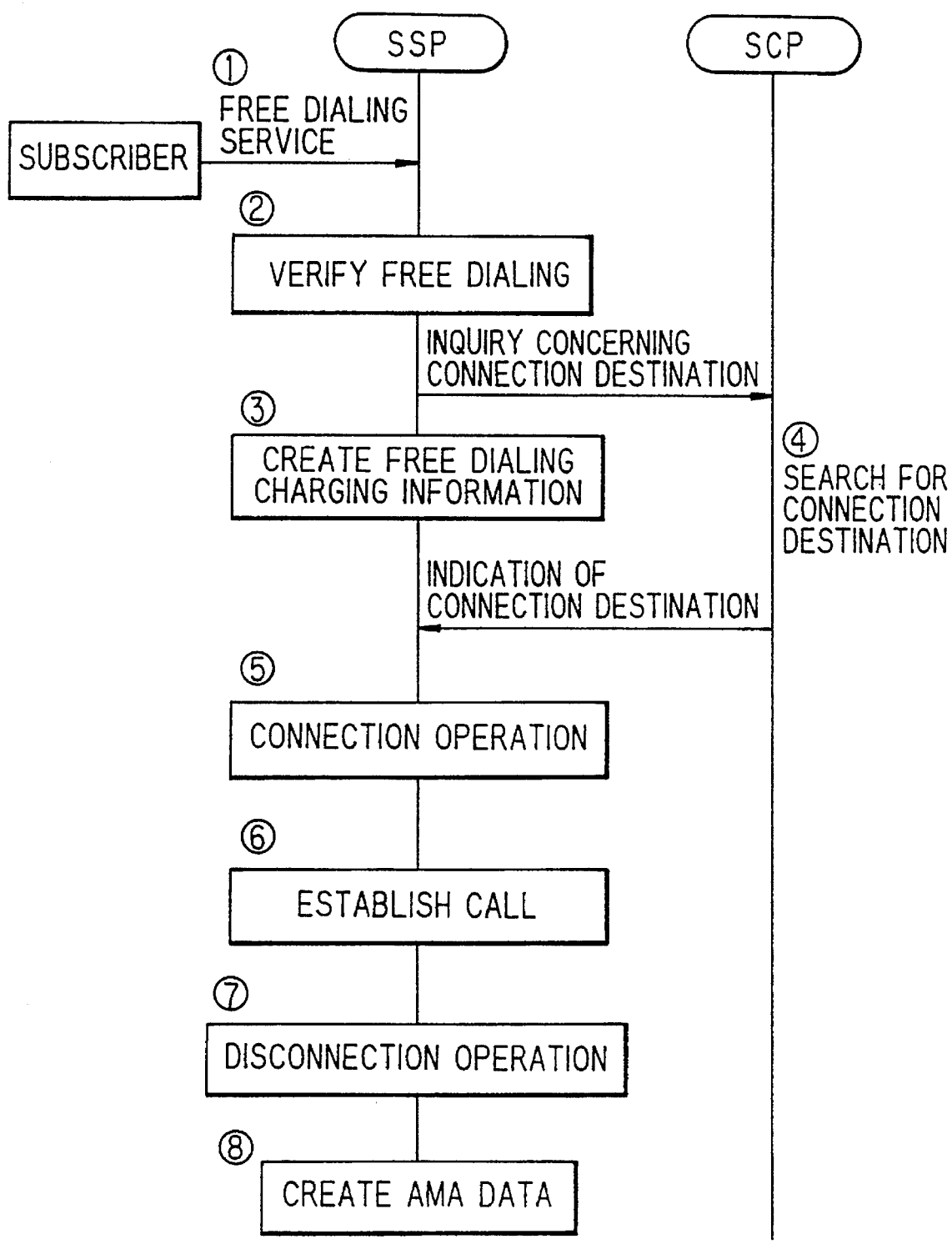
FIG. 17 is a diagram showing the control of a free dialing call according to the prior art.
Figure 18:
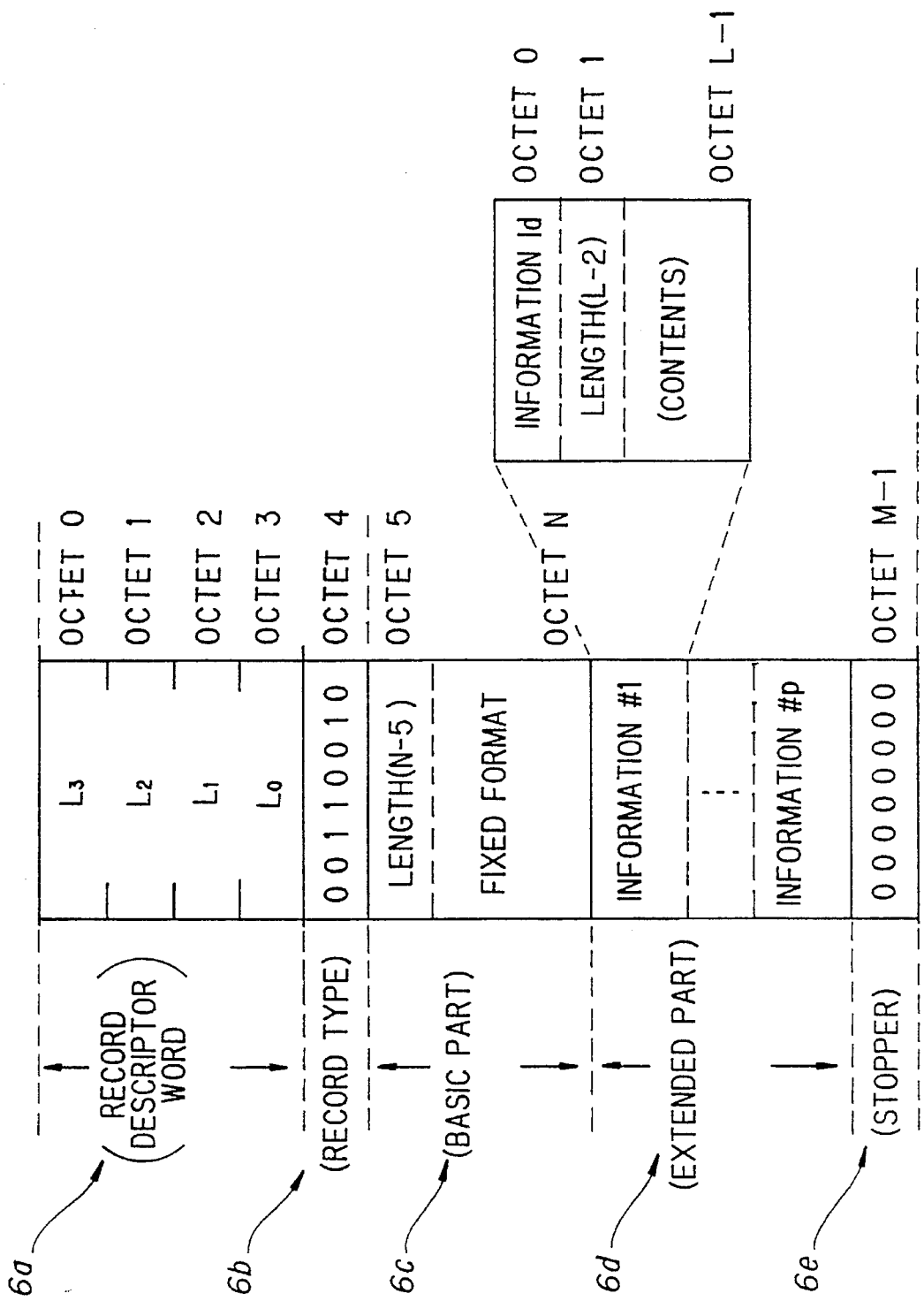
FIG. 18 is a diagram showing the composition of a record of AMA data according to the prior art.

FIG. 15 is a block diagram showing the construction of the service switching point SSP in a case where the adjust configuration is adopted. The service switching point SSP is connected to the service control point AD by an X.25 network. The service switching point SSP includes a network switching module (NW) 51a, a call processing processor (CPR) 51b for implementing the switching function SSF such as call processing or charging processing, a subscriber circuit (LC) 51c, a trunk (TRK) 51d, announcement equipment (ANE) 51e for outputting various voice messages, bus lines 51f, 51g, a main processor (MPR) 51h, a packet link controller (PLC) 51i, interchannel communication adapters (CCA) 51j, 51k, and a magnetic tape unit (MT) 51m for storing detailed charging information.

The call processing processor 51b of the service switching point SSP sends data to the main processor 51h via the interchannel communication adapters 51j, 51k, and the main processor 51b transfers this data to the service control point AD via the packet link controller PLC and X.25 network. The service control point AD sends data to the service switching point SSP via the X.25 network. In the service switching point SSP, the main processor (MPR) 51h accepts the data via the packet link controller PLC and transfers the data to the call processing processor 51b via the interchannel communication adapters 51j, 51k.

Accordingly, when the service access code is received from a subscriber, the call processing processor 51b performs an exchange of control data with the service control point AD via the interchannel communication adapter 51j, 51k, the main processor 51h, the packet link controller 51i and the X.25 network, and finally connects the originating terminal with the terminating terminal. The service control point AD creates the IN-related charging information (see FIGS. 8, 9) in the course of service processing and sends the created information to the call processing processor 51b of the service switching point SSP. The call processing processor 51b stores the IN-related charging information sent from the service control point AD, creates the non-IN-related charging information at the end of the call, subsequently combines the stored IN-related charging information with the non-IN-related charging information to create the detailed charging information, transfers this detailed charging information to the main processor 51h and stores the charging information on the magnetic tape 51m.

In accordance with the present invention as described above, the arrangement is such that in a case where an additional service has been requested by a subscriber, a service control point executes control for the purpose of this additional service, creates charging information (IN-related charging information) related to the additional service and sends this information to a service switching point. The service switching point creates non-IN-related information, which is information other than the IN-related charging information, as part of detailed charging information, and combines the IN-related charging information, which is sent from the service control point, with the non-IN-related charging information, thereby creating detailed charging information. As a result, when a new service is introduced, it will suffice to change only the software of the service control point SCP, and there is no need to change the software of the service switching point SSP. For example, even if there is a change in a collected item of IN-related charging information or in the editing format owing to introduction of a new service, creation of detailed charging information conforming to a new IN service becomes possible merely by changing the collected item or format incorporated in the software of the service control point.

Further, in accordance with the present invention, a format structure is adopted in which the detailed charging information has a variable length and the non-IN-related charging information can be combined with the IN-related charging information. As a result, the service switching point SSP is capable of creating the detailed charging information in a simple manner merely by combining the IN-related charging information with the non-IN-related charging information, which it itself has created, without referring to the content of the IN-related charging information sent from the service control point SCP (i.e., without any relation to the constitution of the content of the IN-related charging information). For example, the detailed charging information can be composed of (a) a charging information identifier, (b) a charging information field length, (c) a basic part in which non-IN-related charging information is entered, (d) an extended part and (e) a stopper indicating the end of the charging information, and a format can be adopted in which a plurality of the extended parts are provided if necessary. Further, the IN-related charging information can be composed of additional information, which includes an IN-related charging information identifier, additional-information length and the name of the additional service, so as to have a structure identical with that of the extended part, and the service switching point SSP is capable of creating detailed charging information in a simple manner merely by placing the IN-related charging information as an extended part after the extended part of the non-IN-related charging information and placing the stopper after the IN-related charging information.

Further, in accordance with the present invention, the service control point SCP creates IN-related 15 charging information in the course of a call control procedure associated with an additional service and sends the information to the service switching point SSP. The latter stores the IN-related charging information together with data indicating whether the IN-related charging information has been received from the service control point SCP, and determines whether the IN-related charging information has been received by referring to the above-mentioned data at the end of the call. If the IN-related charging information has been received, the service switching point SSP creates non-IN-related charging information and combines the non-IN-related charging information and the IN-related charging information to create detailed charging information. As a result, it will suffice to provide the service switching point SSP with software for (1) creating the non-IN-related charging information, (2) storing IN-related charging information that has been transferred to it and (3) combining the IN-related charging information with the non-IN-related charging information at the end of the call. This makes it unnecessary to change the software even when a new service is introduced.

As many apparently widely different embodiments of the present invention can be made without departing from the spirit and scope thereof, it is to be understood that the invention is not limited to the specific embodiments thereof except as defined in the appended claims.

What is claimed is:

1. A service switching point equipped with a switching function and connected via a communication network to a service control point equipped with an additional service control function, the service switching point comprising:

means for receiving, via the communication network, first charging information unique to the additional service from the service control point, the first charging information created by the service control point when the additional service has been requested by a subscriber;

means for creating second charging information, including charging information different from the first charging information; and means for creating detailed charging information for the additional service by combining the first charging information, which is sent from said service control point, with the second charging information which is created in the service switching point.

2. The service switching point according to claim 1, wherein detailed charging information has a variable length format.

3. A service Switching point equipped with a switching function and connected via a communication network to a service control point equipped with an additional service control function, the service switching point comprising:

means for receiving, via the communication network, first charging information, related to the additional service from the service control point, the first charging information created by the service control point when the additional service has been requested by a subscriber;

means for creating second charging information unique to an ordinary service, the second charging information to be used as part of detailed charging information; and means for creating detailed charging information by combining the first charging information, which is sent from said service control point, with the second charging information, which is created in the service switching point, the detailed charging information including a charging information identifier, a charging information field length, a basic part in which the second charging information is entered a plurality of extended parts and a stopper indicating end of the charging information;

the first charging information having a structure identical to a structure of the extended part, the first charging information includes a first charging information identifier, an additional-information length and a name of the additional service; and said means for creating the detailed charging information creates the detailed charging information by placing the first charging information as an extended part after the extended part of second charging information and placing the stopper after the first charging information.

4. The service switching point according to claim 3, wherein said second charging information includes at least a calling party number, a called party number, call answer time and call release time.

5. The service switching point according to claim 1, wherein said service switching point has means for storing the first charging information together with data indicating whether the first charging information has been received from the service control point in the course of call control processing related to the additional service, and said means for creating the detailed charging information determines whether the first charging information has been received by referring to said data at the end of the call and, if the first charging information has been received, creates the detailed charging information by combining the first charging information with the second charging information.

6. A system for creating detailed charging information for an additional service, comprising:

a service switching point having a service switching function;

a service control point having an additional service control function, said service control point having a data base for storing various data for an additional service and means for executing the additional-service control, upon referring to data stored in the data base, when an additional service has been requested, and for creating first charging information which is unique to the additional-service for use as part of detailed charging information and transmitting the first charging information to a service switching point;

a network for performing an exchange of signals between these two points; and said service switching point having:

means for creating second charging information including charging information different from the first charging information, for use as part of the detailed charging information; and means for creating the detailed charging information by combining the first charging information, which is sent from said service control point, with the second charging information, which is created in the service switching point.

7. The system according to claim 6, wherein said service switching point has means for storing the first charging information together with data indicating whether the first charging information has been received from the service control point in the course of call control processing related to the additional service, and said means for creating the detailed charging information determines whether the first charging information has been received by referring to said data at the end of the call and, if the first charging information has been received, creates the detailed charging information by combining the first charging information with the second charging information.

8. The system according to claim 6, wherein said signal network is a No. 7 common channel signaling network.

9. The system according to claim 6, wherein said service switching point and said service control point are placed in 1:1 correspondence and perform an exchange of signals between the two points by a prescribed protocol such as X.25.

* * * * *

UNITED STATES PATENT AND TRADEMARK OFFICE
CERTIFICATE OF CORRECTION

PATENT NO. :   5,511,113
DATED      :   April 23, 1996
INVENTOR(S) :  Koji TASAKI, et al.

It is certified that error appears in the above-indentified patent and that said Letters Patent is hereby corrected as shown below:

Column 10, line 15, after "step" delete "20" and subsitute therefor --120--.

Column 11, line 28, delete "5".

Colmn 12, line 38, change "51b" to --51h--.

Signed and Sealed this

Twentieth Day of August, 1996

Attest:

BRUCE LEHMAN

Attesting Officer

Commissioner of Patents and Trademarks